(12) United States Patent
Hirano

(10) Patent No.: US 7,143,002 B2
(45) Date of Patent: Nov. 28, 2006

(54) METHOD FOR DETECTING EXTERNAL ACCELERATION TO A HARD DISK DRIVE BY A SPINDLE MOTOR

(75) Inventor: Toshiki Hirano, San Jose, CA (US)

(73) Assignee: Hitachi Global Storage Technologies B.V., Amsterdam (NL)

( * ) Notice: Subject to any disclaimer, the term of this patent is extended or adjusted under 35 U.S.C. 154(b) by 0 days.

(21) Appl. No.: 11/106,920

(22) Filed: Apr. 15, 2005

(65) Prior Publication Data

US 2006/0235640 A1    Oct. 19, 2006

(51) Int. Cl.
G01P 15/00   (2006.01)
G06F 15/00   (2006.01)

(52) U.S. Cl. .......................... 702/141; 318/560; 360/75
(58) Field of Classification Search ................ 702/141
See application file for complete search history.

(56) References Cited

U.S. PATENT DOCUMENTS 4,947,093 A * 8/1990 Dunstan et al. ............. 318/560
5,227,929 A * 7/1993 Comerford .................. 360/75

* cited by examiner

Primary Examiner—John Barlow
Assistant Examiner—Sujoy Kundu

(57) ABSTRACT

A method for detecting an external acceleration applied to a hard disk drive is described. The method includes obtaining a running current value for a spindle motor operating a hard disk drive. The running current is provided from a controller coupled with the hard disk drive. The method further includes compensating the running current value for positional orientation of a data transducer and for torque disturbance. The method also includes filtering the running current value for removal of motor noise and direct current offset which, subsequent thereto, provides an estimated external acceleration amplitude. The method also includes invoking a defensive action for preventing damage to the data transducer and the data storage disk and loss of data disposed on the data storage disk. The defensive action is triggered when the estimated external acceleration amplitude exceeds a threshold value.

20 Claims, 10 Drawing Sheets

METHOD FOR DETECTING EXTERNAL ACCELERATION TO A HARD DISK DRIVE BY A SPINDLE MOTOR

FIELD OF THE INVENTION

The present invention relates to preventing damage to a hard disk drive. More precisely, the present invention utilizes a spindle motor for detecting an external acceleration to a hard disk drive.

BACKGROUND OF THE INVENTION

Hard disk drives are used in almost all computer system operations, and recently even in consumer electronic devices such as digital cameras, video recorders, and audio (MP3) players. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago. The hard drive model includes a plurality of storage disks or hard disks vertically aligned about a central core that can spin at a wide range of standard rotational speeds depending on the computing application in which the hard disk drive is being used. Commonly, the central core is comprised, in part, of a spindle motor for providing rotation of the hard disks at a defined rotational speed. A plurality of magnetic read/write transducer heads, commonly one read/write transducer head per surface of a disk, where a head reads data from and writes data to a surface of a disk, are mounted on actuator arms.

Data is formatted as written magnetic transitions (information bits) on data tracks evenly spaced at known intervals across the disk. An actuator arm is utilized to reach out over the disk to or from a location on the disk where information is stored. The complete assembly at the extreme of the actuator arm, e.g., the suspension and magnetic read/write transducer head, is known as a head gimbal assembly (HGA).

In operation, pluralities of hard disks are rotated at a set speed via a spindle motor assembly having a central drive hub. Additionally, there are channels or tracks evenly spaced at known intervals across the disks. When a request for a read of a specific portion or track is received, the hard disk drive aligns a head, via the actuator arm, over the specific track location and the head reads the information from the disk. In the same manner, when a request for a write of a specific portion or track is received, the hard disk drive aligns a head, via the actuator arm, over the specific track location and the head writes the information to the disk.

Particularly, the data, the read/write head, and the hard disk are vulnerable to loss and/or damage during read/write operations. During a read/write operation, the read/write head is in very close proximity to the surface of the hard disk. If the hard disk is exposed to a shock or force during a read/write operation, the read/write head can contact the surface of the hard disk. This impact can cause loss of data being accessed or loss of data being written to the hard disk. An impact between the read/write head and the surface of the hard disk can also cause damage to the read/write head and/or the surface of the hard disk. In many instances, the read/write head and/or the hard disk, or portions thereof, are rendered useless due to damage caused by the impact.

Accordingly, solutions comprised of mechanisms and/or protective measures have been developed for preventing such damage. These measures can include; causing an unload which is removing the head from close proximity of the hard disk thus preventing head contact with data surface of the hard disk, braking which halts the rotation of the hard disk, parking which places the read/write head in proximity to a predefined sector or track of the hard disk that is configured to not hold data, and the like. While hard disk drives implemented in certain types of computer systems, e.g., desktop, workstation, servers, and the like, are less likely to be subject to an external shock or force than hard disk drives implemented in those computer systems designed for mobility, e.g., laptops, mini computers and the like, it is common for these mechanisms and measures to be utilized in most hard disk drives, regardless of the computer system into which they are to be implemented.

One solution, as described in U.S. Pat. No. 5,227,929 to Comerford, and as shown in FIG. 9 (Prior Art), is to utilize an accelerometer 50, mounted to the frame within a hard disk drive 11, communicatively coupled to a dedicated processor 51. Hard disk drive 11 is generally comprised of one or more magnetic disks, a read/write head for each surface of each magnetic disk, an actuator arm from which each read/write head extends, a central core for rotating the disk, a motor for maneuvering the read/write heads over a particular section of the magnetic disk, and circuitry for enabling proper function of the hard disk drive.

The accelerometer 50 provides output signals for each of the three axes, e.g., X, Y and Z, to dedicated processor 51. Dedicated processor 51 continuously monitors the acceleration signals, computes the resultant acceleration vector and compares the scalar magnitude of the acceleration vector with a preset range of values. The preset range represents an acceleration that would suggest and impending impact. When such an event occurs, the dedicated processor 51 then directly signals controller 19, or alternatively signals the central processing unit (CPU) 2 of the computer system 1, in which hard disk drive 11 is implemented, which then signals controller 19, to cause a parking of the disk heads and/or a stoppage of the rotation of the disk.

While this solution may provide a measure of protection, it is not without drawbacks. A major drawback to an accelerometer is the cost. Currently, the cost of an accelerometer is estimated to be approximately three dollars (US). Another drawback is that the accelerometer 50 is to be mounted within the hard disk drive housing. By virtue of the continued miniaturization of a hard disk drive, particularly with regard to newer low profile hard disk drives, an accelerometer 50 can utilize excessive real estate within the housing such that continued miniaturization can be limited, delayed and/or prevented. In some instances, currently available accelerometers are of such size that they do not comply with the form factor of low profile or miniature hard disk drives. Another drawback is that an accelerometer 50 requires a dedicated processor 51 which, along with the accelerometer, can also utilize excessive real estate and both of which can require additional power. When implemented in a portable computing system that does not have an unlimited power supply, e.g., a laptop computer, these additional components, e.g., accelerometer 50 and dedicated processor 51, can have a detrimental effect on the limited power supply contained within the portable computer system. Another drawback is that to implement the accelerometer 50 and the dedicated processor 51, significant alterations to existing wiring and their related connections are performed to enable proper hard disk drive functionality as well as the proper functioning of the accelerometer and the dedicated processor.

Therefore, what is needed is a way to detect an external force applied to a hard disk drive while utilizing information obtained from existing components and structures within a hard disk drive.

SUMMARY OF THE INVENTION

Embodiments of the present invention provide a method and system for detecting an external force applied to a hard disk drive by a spindle motor. In an embodiment, the method consists of obtaining a running current value applicable to a spindle motor operating in conjunction with hard disk drive operation. The running current value is obtained from a controller coupled with the hard disk drive. The controller is for maintaining proper rotational speed of a data storage disk in said hard disk drive. The present method further includes compensating the running current value for positional orientation of a data transducer relative to magnetic data located on the data storage disk and compensating for torque disturbance. The data transducer is coupled with the hard disk drive. The method further includes filtering the running current value to remove motor noise and direct current offset. The running current, subsequent to the compensating and the filtering, provides an estimated external acceleration amplitude. The method further includes monitoring the estimated external acceleration amplitude. The method further includes invoking a defensive action for preventing damage to the data transducer and the data storage disk and loss of data disposed on the data storage disk. The defensive action is performed by the hard disk drive. The invoking is triggered when the estimated external acceleration amplitude exceeds a threshold value. In an embodiment, the threshold value is a pre-determined value. Alternatively, the threshold value is continuously adjusted in accordance with a background acceleration level.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
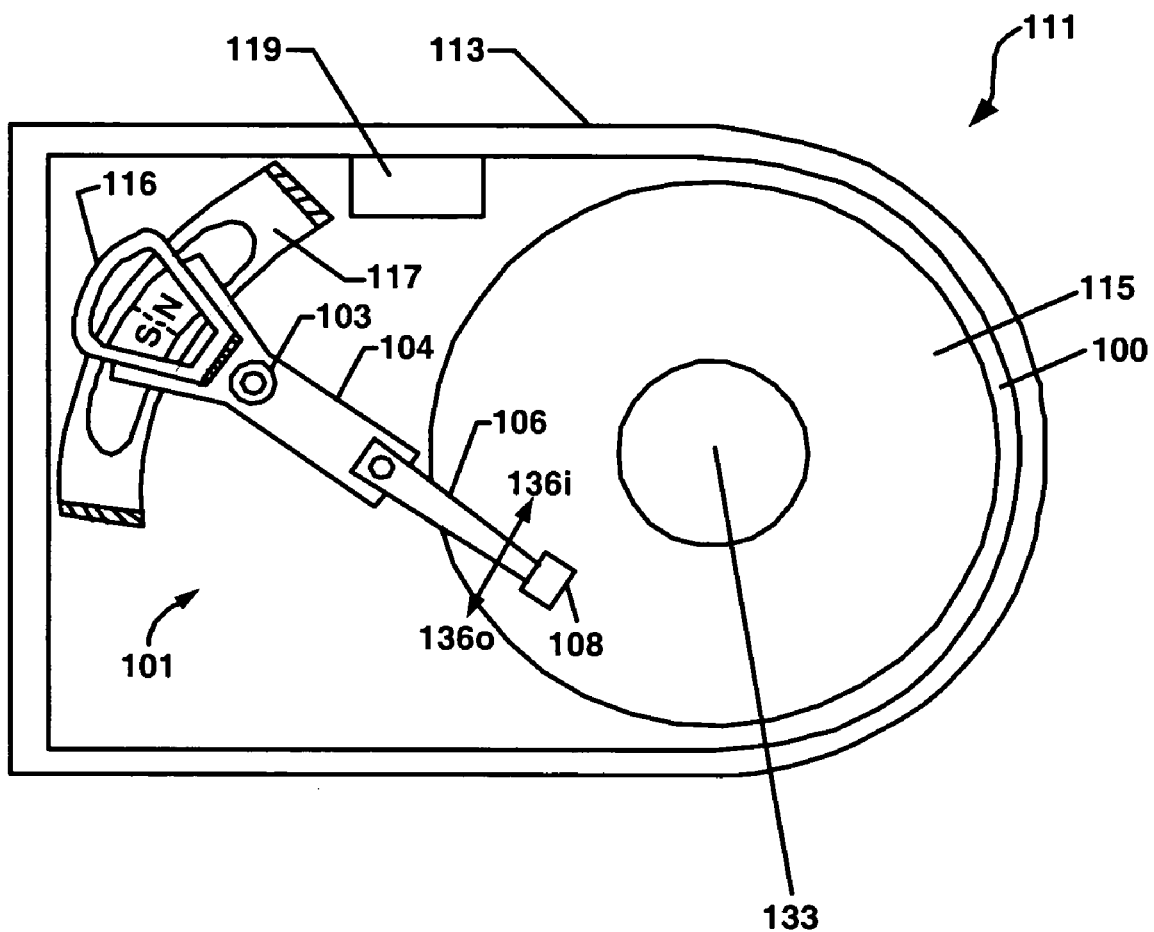
FIG. 1 is a block diagram of a hard disk drive including a spindle motor in an embodiment of the present invention.

A method and system for detecting an external acceleration applied to a hard disk drive by a spindle motor is described. In the following description, for purposes of explanation, numerous specific details are set forth in order to provide a thorough understanding of the present invention. It is noted that one skilled in the art will comprehend that the present invention may be practiced without these specific details. In other instances, well-known structures and devices are shown in block diagram form in order to avoid obscuring the present invention.

Some portions of the detailed descriptions, which follow, are presented in terms of procedures, steps, logic blocks, processing, and other symbolic representations of operations that can be performed in the operation of a hard disk drive. These descriptions and representations are the means used by those skilled in the data processing arts to most effectively convey the substance of their work to others skilled in the art. A procedure, executed step, logic block, process, etc., is here, and generally, conceived to be a self-consistent sequence of steps, instructions, or fabrications leading to a desired result. The steps are those requiring physical manipulations of physical entities and/or quantities. Usually, though not necessarily always, these entities take the form of structures, components, and/or circuits utilized in the operation of a hard disk drive.

It should be borne in mind, however, that all of these and similar terms are to be associated with the appropriate physical entities and are merely convenient labels applied to these entities. It is noted that throughout the present invention, discussions are presented that refer to the actions and processes of a spindle motor in conjunction with hard disk drive operation or other such data storage enabling devices.

The present invention is discussed primarily in the context of a hard disk drive. Embodiments of the present invention can be readily implemented in conventionally sized hard disk drives, e.g., 3.5 inch drives, and diminutively sized hard disk drives of low profile height. One such diminutively sized hard disk drive (MHDD) is the Microdrive™. Embodiments of the present invention are well suited to be utilized in larger sized hard disk drives of low profile as well. Embodiments of the present invention can be used with alternative types of hard disk drives including, but which is not limited to, low profile hard drives (e.g., 1.8 inch form factor HDDs), embedded hard disk drives, and other data storage devices that have the capability to affect access upon a data storage device and from which data can be stored and/or otherwise manipulated.

New utilization of existing and available information obtained with regard to the amount of running current required to maintain constant spin speed of the spindle motor is proposed for detecting an external acceleration. By virtue of a running current being somewhat sensitive to a vibration or external acceleration, embodiments of the present invention provide monitoring the spindle motor running current such that detected fluctuations are interpreted to predict impending shock. By detecting fluctuations in running current, embodiments of the present invention can initiate measures to prevent damage to the read/write head and/or to the surface of the hard disk including, but which is not limited to, causing an unload.

FIG. 1 shows a schematic of a hard disk drive 111 in which an embodiment of the present invention (not shown) can be implemented. Currently, low profile hard disk drives such as a 1.8-inch form factor and a Microdrive™ hard disk drive compatible with the Compact Flash Type II form factor have a height of 5.0 millimeters. In other instances, a Microdrive™ can have a form factor footprint smaller than that of the Compact Flash standard. It is particularly noted that embodiments of the present invention are well suited for implementation in most hard disk drives including, but which is not limited to, conventionally sized (e.g., 3.5 inch) hard disk drives, low profile hard disk drives, miniature hard disk drives, and micro drive hard disk drives.

Hard disk drive 111 includes an outer housing or base 113 containing one (shown) or more magnetic disks 115. A spindle motor assembly 100 having a central drive hub 133 rotates magnetic disks 115. Within spindle motor assembly 100 there is a bearing system 110 (not shown) containing a shaft and sleeve assembly, e.g., bearing systems 210 and 310 as described in FIGS. 2 and 3, respectively, and which are incorporated herein by reference. An actuator 101 includes a plurality of actuator arms 104 (one shown) in the form of a comb that is pivotally mounted above a pivot assembly 103. A controller 119 is also coupled to base 113 for selectively moving the actuator arm 104 relative to disk 115 and for regulating the rotating speed of disks 115.

In the embodiment shown in FIG. 1, actuator arm 104 has extending there from a cantilevered load beam or suspension 106, a magnetic read/write transducer or head 108 mounted on a slider secured to a flexure that is flexibly mounted to each suspension 106. Read/write head 108 magnetically reads data from and magnetically writes data to disk 115. The head gimbal assembly is read/write head and slider 108 mounted on suspension 106. Suspension 106 has a spring like quality for biasing or urging the slider against the disk to enable the creation of air bearing film, or air bearing surface, between the slider and the disk surface. A voice coil 116 housed within a conventional voice coil motor magnet assembly 117 (top pole not shown) having a magnet 118 (not shown) is also mounted to actuator arm 104 opposite the head gimbal assembly. Movement of the actuator 101 by controller 119 moves the head gimbal assembly radially across tracks on the disks 115 (inwardly as indicated by arrow 136i and outwardly as indicated by arrow 136o) until heads 108 settle on the target tracks.

Figure 2:
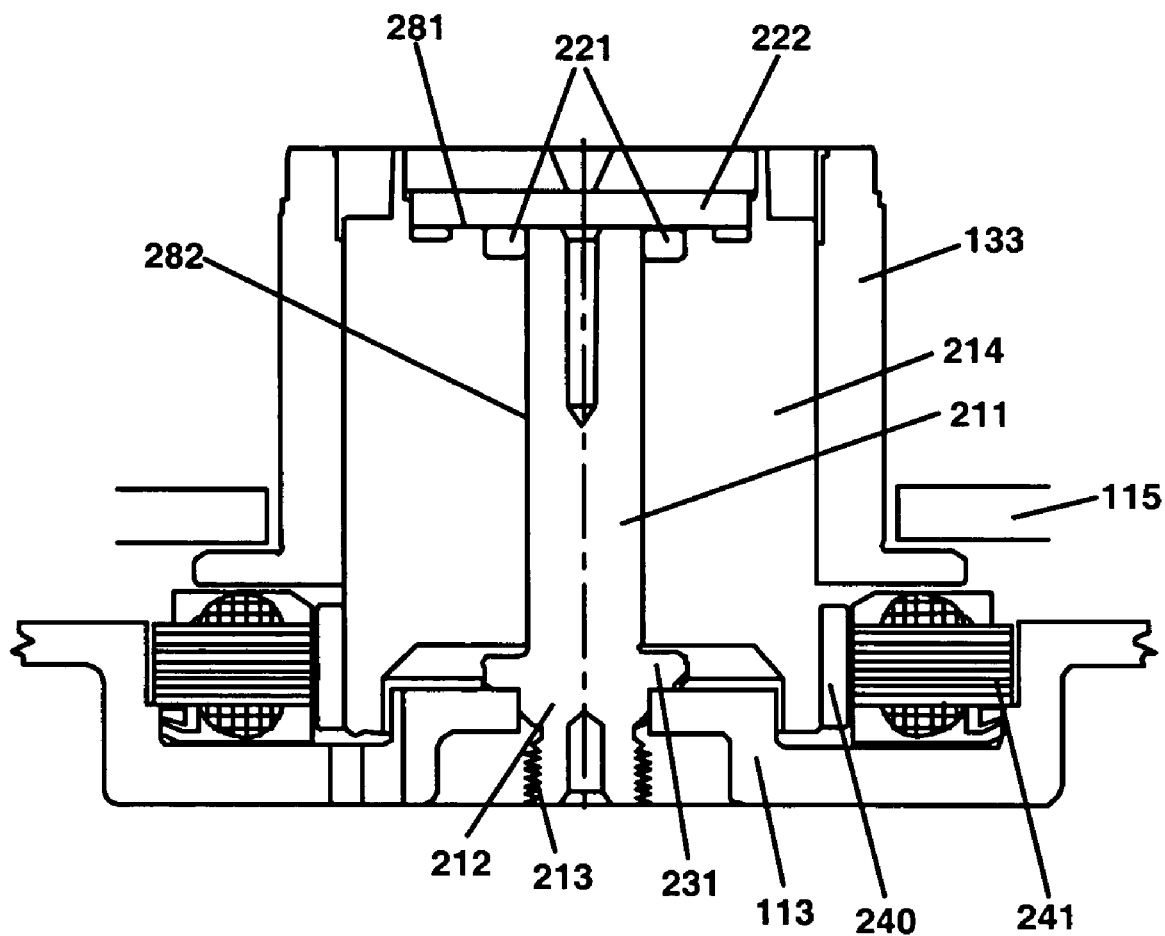
FIG. 2 is an illustrated side elevation of a bearing system used in the spindle motor of FIG. 1 for providing related information for detecting an external acceleration applied a hard disk drive in an embodiment of the present invention.

FIG. 2 is a side elevation illustration of a bearing system 210 that is functionally operational in hard disk drive 111 and configured for implementation within spindle motor 100 of FIG. 1. In the present embodiment, bearing system 210 is a fluid dynamic bearing having a rotating sleeve 214 and a fixed shaft 211. A thrust plate 221 is disposed on one end of fixed shaft 211. Fixed shaft 211 is fixed relative to rotating sleeve 214 and a counterplate 222 supported on sleeve 214. Counterplate 222 is fixed on sleeve 214 by being pressed or similarly fixed inside a shoulder 230 on hub 133. Counterplate 222, in conjunction with surfaces of thrust plate 221, establishes a fluid dynamic thrust bearing in chamber or gap 281 for supporting rotating shaft 211 during operation. A fluid dynamic journal bearing is manifested in gap or chamber 282 between fixed shaft 211 and rotating sleeve 214 supported on fixed shaft 211. The opposing end of shaft 211 includes a shoulder 231 resting upon an upraised portion of base 113 of disk drive 111 in which bearing system 210 is disposed. A shaft extension 212 extends through an opening in base 113. Additionally, the threaded mounting end 213 of shaft 211 receives an appropriate retentive device, e.g., a nut, clip, or other mechanism causing retention (not shown), which affixes shaft 211 in place within base 113. A hub 133 is supported on the outside of sleeve 214, and a magnet 240 is disposed on the same surface of sleeve 214 and aligned with a stator 242. Stator 242 is supported from the base casting 113. Energizing stator 242 provides a field which interacts with magnet 240 to cause rotation of the hub 133. One or more disks 115 are supported on the surface of the hub.

A fluid (gas or liquid) is disposed between the surfaces of fixed shaft 211 and thrust plate 221 for providing support during rotation. Further, the corresponding inner surfaces of rotating sleeve 214 and threaded counterplate 222 have disposed thereon patterned grooves for providing defined pressures in the fluid and also for supporting rotating sleeve 211 during the rotation thereof.

During normal operation, there is a known friction is associated with the rotation of rotating shaft 211 relative to stationary sleeve 214 in conjunction with fluid contained therein. Upon an acceleration being externally applied to a hard disk drive, e.g., hard disk drive 111, there is a change in the friction associated with the fluid within the bearing system. Accordingly, controller 119 attempts to make necessary adjustments to correct either an increase or decrease in the friction.

Figure 3:
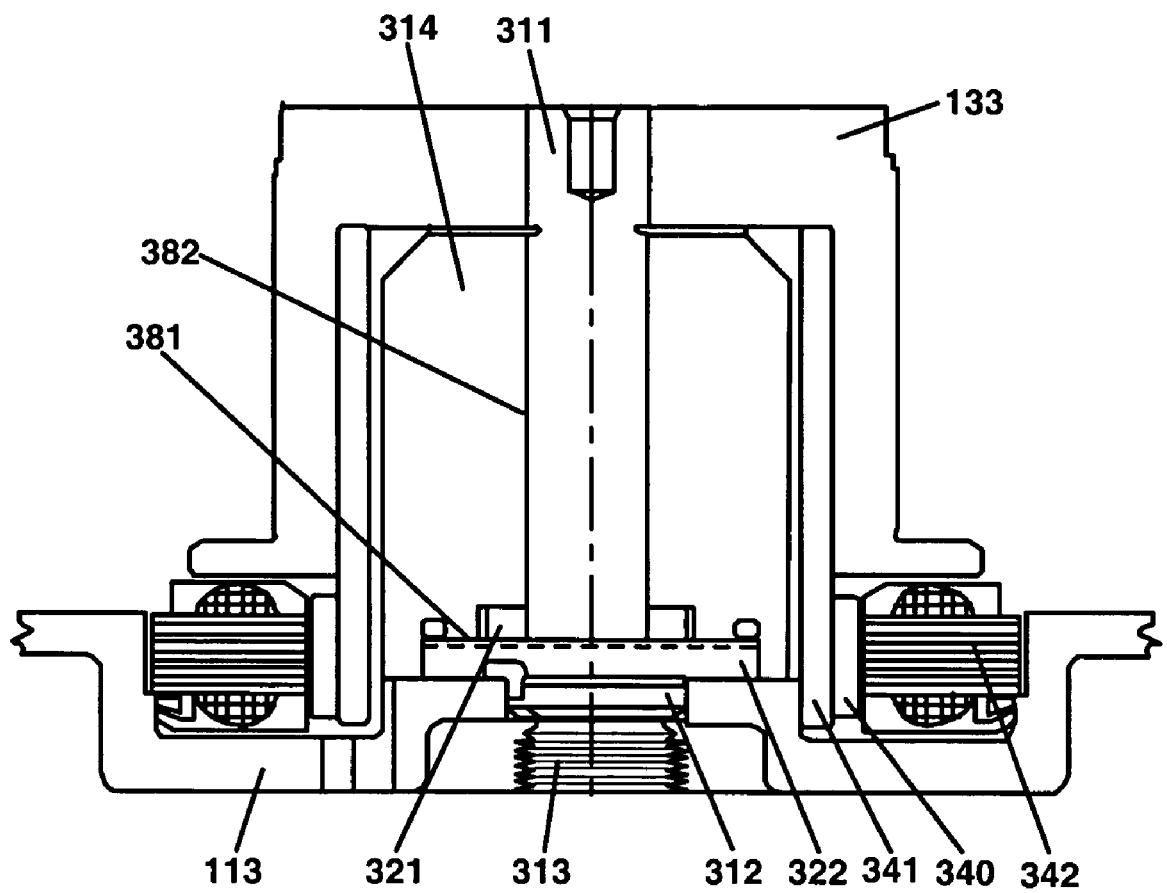
FIG. 3 is an illustrated side elevation of another bearing system used in the spindle motor of FIG. 1 for providing related information for detecting an external acceleration applied to a hard disk drive in an embodiment of the present invention.

FIG. 3 is a side elevation illustration of a bearing system 310 that is functionally operational in hard disk drive 111 of FIG. 1 and configured for implementation within a spindle motor 100. In the present embodiment, bearing system 310 is a fluid dynamic bearing having a fixed sleeve 314 and within which rotates a rotating shaft 311. Fixed sleeve 314 operates in conjunction with an integral counterplate 322 for chamber 380 (also referred to as a gap or space) and within which rotating shaft 311 rotates. Counterplate 322, in conjunction with surfaces of thrust plate 321, establishes a fluid dynamic thrust bearing in chamber or gap 381 for supporting rotating shaft 311 during operation. Counterplate 322 also includes an extension 312 and a threaded mounting end 313. A fluid dynamic journal bearing is manifested in gap or chamber 382 between fixed sleeve 314 and rotating shaft 311 and thrust plate 321 supported on rotating shaft 311.

A fluid (gas or liquid) is disposed between the surfaces of rotating shaft 311 and thrust plate 321 for providing support during rotation. Further, the corresponding inner surfaces of fixed sleeve 314 and threaded counterplate 322 have disposed thereon patterned grooves for providing defined pressures in the fluid and also for supporting rotating shaft 311 during the rotation thereof.

Also included in FIG. 3 is a hub 133 that includes a magnet 340 and a back iron 341 and which is mounted on rotating shaft 311 at shaft end 315. This assembly is then inserted into base 113 and mounted therewithin via extension 312 and threaded mounting end 313. An opening in base 113 enables extension 312 and threaded mounting end 313 to affix to base 113 via a nut (not shown) or other attaching means, e.g., a retaining clip or an interference fit.

Similar to bearing system 210, during normal operation of bearing system 310, there is a known friction is associated with the rotation of rotating sleeve 314 relative to stationary shaft 311 in conjunction with fluid contained therein. Upon an acceleration being externally applied to a hard disk drive, e.g., hard disk drive 111, there is a change in the friction associated with the fluid within the bearing system. Accordingly, controller 119 attempts to make necessary adjustments to correct either an increase or decrease in the friction.

With combinational reference to FIGS. 2 and 3, a unique feature of a fluid dynamic bearing is that the friction caused by the fluid during rotation is a function of the force applied to the bearing. Further, when the spindle motor and hard disk 115, coupled therewith, are spinning, the friction of the spindle motor is also a function of external acceleration, because the loading force to the bearing changes due to spindle motor and disk inertia. With reference to a spinning mass, inherent to a fluid dynamic bearing, e.g., bearing system 210 and 310 of FIGS. 2 and 3, upon an acceleration applied to the mass there is generated additional force to the fluid dynamic bearing. This results in a change in spindle motor friction that is detected by a circuit that is configured to maintain constant rotational speed, e.g., controller 119 of FIG. 1. When a change in spindle motor friction is detected, such that spindle speed varies, controller 119 attempts to apply an amount of torque to correct a fluctuation in spindle speed.

While embodiments of the present invention are described in conjunction with a hard disk drive 111 having a spindle motor configured with a fluid dynamic bearing, as shown in bearing system 210 in spindle motor 200 of FIG. 2 and in bearing system 310 in spindle motor 300 of FIG. 3, it is noted that embodiments of the present invention are well suited for implementation in conjunction with alternative spindle motors which can include, but which is not limited to, those configured with a fixed ball bearing shaft, a rotating ball bearing shaft, and the like. In fact, embodiments of the present invention are well suited for implementation with nearly any spindle motor.

Figure 4:
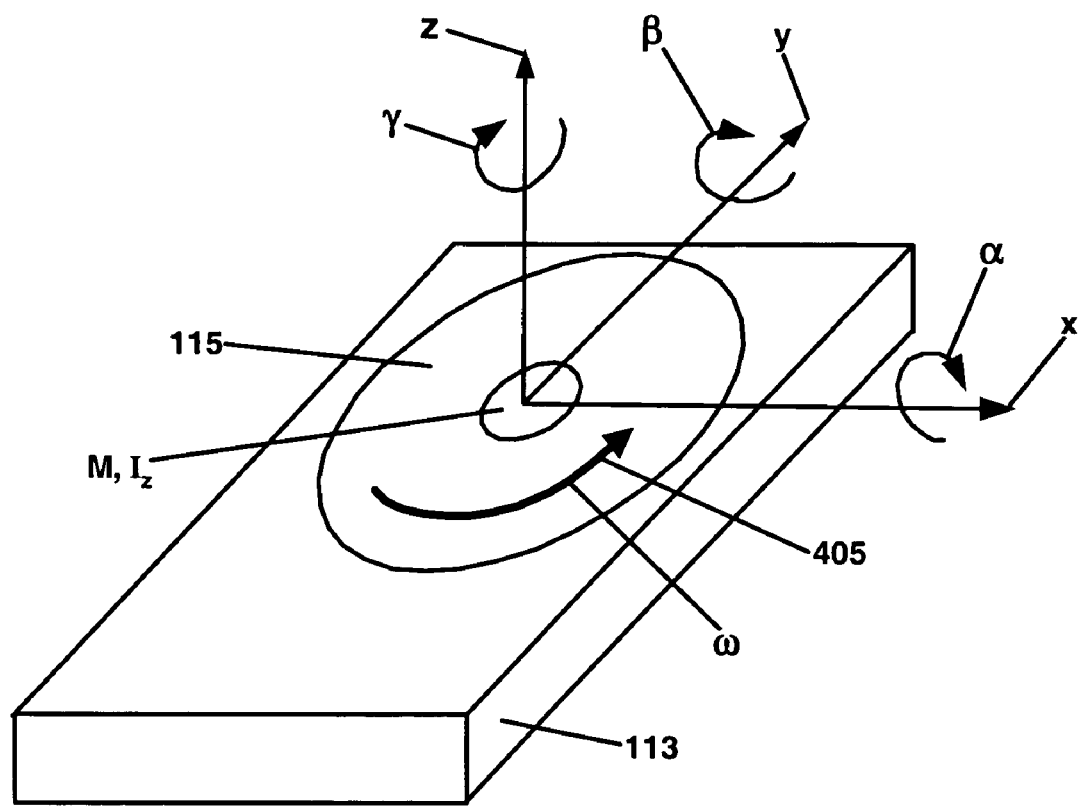
FIG. 4 is a block diagram of a hard disk drive showing axis and planes upon which an externally applied acceleration can be detected in an embodiment of the present invention.

FIG. 4 is a block diagram of a hard disk drive 111 to illustrate the relationship between external forces and spindle bearing system load applicable to a spindle motor, e.g., spindle motor 100 of FIG. 1 having a fluid dynamic bearing system 210 of FIG. 2 or a fluid dynamic bearing system 310 of FIG. 3 implemented therewithin, during the operation thereof. Hard disk drive 111 shows a hard disk 115 having a rotation applied thereto, as indicated by arrow 405, and which has a rotational speed applicable thereto, indicated by ω. Three axes or planes upon which acceleration load forces can be applied to a fluid dynamic bearing system 210 and 310 are:

the x axis, representing side to side or horizontal movements;

the y axis, representing forward and backward movements; and the z axis, representing up and down movements.

Further, each axis or plane x, y and z has applicable thereto a gyroscopic rotational plane, planes α, β, and γ, respectively. Thus, there are six different planes upon which a force from an external acceleration can be applied and detected with regard to bearing system 210/310.

For example, if hard disk 111 is moved in a side-to-side direction, e.g., along the x axis (also referred to as a journal load), a bearing system 210/310 realizes an additional load by an acceleration force applied thereto. This force can be calculated in the following expression:

$$Fx = m^*Ax \quad (1)$$

Where:

Fx=additional load by acceleration force

Ax=acceleration is x direction m=rotating mass of the spindle bearing system

Thus, when an external acceleration, e.g., Ax, in the direction of the x axis is applied to hard disk 111, spindle motor 200 or 300 of FIGS. 2 and 3 when configured with a fluid dynamic bearing 210 or 310, respectively, therewithin, a spindle motor will see an additional load in accordance with expression 1.

Similarly, if hard disk 111 is moved in a forward or backward direction, e.g., along the y axis (also referred to as a journal load), a bearing system 210/310 realizes an additional load by an acceleration force applied thereto. This force can be calculated in the following expression:

$$Fy = m^*Ay \quad (2)$$

Where:

Fy=additional load by acceleration force

Ay=acceleration in y direction m=rotating mass of the spindle bearing system

Thus, when an external acceleration, e.g., Ay, in the direction of the y axis is applied to hard disk 111, spindle motor 200 or 300 of FIGS. 2 and 3 when configured with a fluid dynamic bearing 210 or 310, respectively, therewithin, a spindle motor will see an additional load in accordance with expression 2.

Additionally, if hard disk 111 is moved in an upward or downward direction, e.g., along the z axis (also referred to as a thrust load), a bearing system 210/310 realized an additional load by an acceleration force applied thereto. This force can be calculated in the following expression:

$$Fz = m^*Az \quad (3)$$

Where:

Fz=additional load by acceleration force

Az=acceleration in z direction m=rotating mass of the spindle bearing system

Thus, when an external acceleration, e.g., Az, in the direction of the z axis is applied to hard disk 111, spindle motor 200 or 300 of FIGS. 2 and 3 when configured with a fluid dynamic bearing 210 or 310, respectively, therewithin, a spindle motor will see an additional load in accordance with expression 3.

Rotation acceleration, also referred to as gyroscopic rotation, is another external acceleration force that can be applied to a hard disk drive 111. Gyroscopic rotation occurs when a hard disk drive 111 is subjected to a spinning rotation. For example, while a hard disk 115 is spinning, the hard disk drive 111 is subject to a spin movement or rotation. Thus, a gyroscopic rotation acceleration applied upon an axis is a spin applied to a hard disk drive 111 in a particular axis, e.g., x, y and z. When gyroscopic rotation acceleration is applied to hard disk drive 111, there is a focal gyroscopic effect that requires a greater amount of force to rotate the entire hard disk drive and not just hard disk 115 as is common in normal operation.

In an embodiment of the present invention, for torque due to rotational acceleration in the direction of axis x, this can be represented in the following two term expression:

$$Tx = Iz^* \omega^* \int \alpha \, dt + Ix^* \alpha \quad (4)$$

Where:
Tx=torque load generated by angular acceleration in x axis
α=rotational acceleration in x axis
Iz=rotational inertia of spindle motor around z axis
ω=angular rotation speed of spindle motor
∫αdt=time-integral of angular acceleration (equal to angular velocity in x axis)
Ix=rotational inertia of spindle motor in x axis
Ix*α=torque by inertia in direction of x axis In the present embodiment, for torque due to a gyroscopic load in the direction of x axis and torque by inertia in the direction of y axis, this can be represented in the following two term expression:

$$Ty = Iz*\omega*\int \beta dt + Iy*\beta \quad (5)$$

Where:
Ty=torque load generated by rotational acceleration in y axis
β=rotational acceleration in y axis
Iz=rotational inertia of spindle motor around z axis
ω=angular rotation speed of spindle motor
∫βdt=time integral of angular acceleration (equal to angular velocity of y axis)
Iy*β=torque by inertia in direction of y axis It is noted that rotational inertia times rotational acceleration equates to torque.

For rotational acceleration in z axis, the torque applied to the spindle motor is expressed by the following expression:

$$Tz = \gamma * Iz \quad (6)$$

Where:
Tz=torque generated in z direction
γ=angular acceleration in z direction
Iz=rotational inertia of spindle motor in z direction Continuing with reference to FIG. 4, there is also present torque disturbance due to external acceleration and other effects assuming constant friction coefficient of the bearing system, e.g., bearing system 210 and 310 in a spindle motor, e.g., spindle motor 200 and 300, respectively. A torque disturbance can be calculated utilizing the following expression.

$$Td = uj*Fx + uj*Fy + ut*Fz + um*(Tx+Ty) + Tz + T_{others} = uj*m*ax + uj*m*Ay + ut*m*Az + um*(I_z*\omega*\int \alpha dt + Ix*\alpha + Iz*\omega \int \beta dt + Iy*\beta) + \gamma*Iz + T_{others} \quad (7)$$

Where:
Td=torque disturbance
uj=friction coefficient of fluid dynamic bearing in journal direction
um=friction coefficient of fluid dynamic bearing by moment
ut=friction coefficient of fluid dynamic bearing in thrust direction
$T_{others}$=includes air-flow, temperature, head position By virtue of gaps 281 and 282 of FIG. 2 and gaps 381 and 382 of FIG. 3 containing the fluid (gas or liquid, commonly oil) therein of the fluid bearing system, e.g., bearing system 210 and 310 of FIGS. 2 and 3, respectively, when a force is applied to the disk drive 111, there is a reduction in the gap proximal to the direction of the force applied, thus equating to an increase in friction in the fluid due to the viscosity of the fluid. Therefore, a fluctuation in friction of the spindle motor can be expected as a result of an external force applied to one or more of the axes of acceleration associated with disk drive 111. Accordingly, by implementing the above expressions, e.g., 1–6, either alone or in a combination, when an external acceleration is applied to a hard disk drive 111, regardless of the direction of the force, embodiments of the present invention enable detection of a variation in the friction of the spindle motor, which equates to a variation in current.

Figure 5:
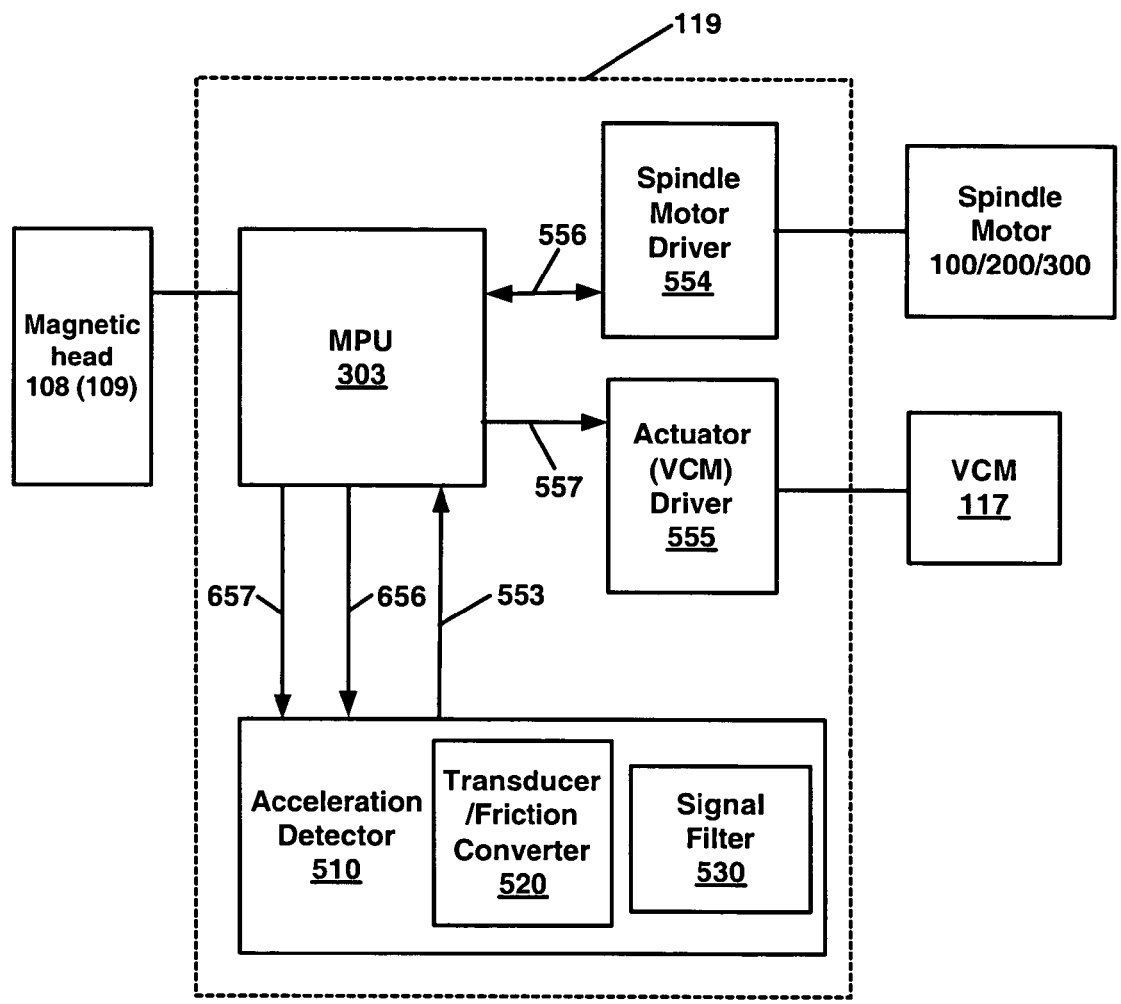
FIG. 5 is a block circuit diagram of a portion of the electronic components communicatively coupled to hard disk drive and in which is implemented an acceleration detector through which spindle motor information is obtained for detecting an external acceleration applied to the hard disk drive in an embodiment of the present invention.

FIG. 5 is a block circuit diagram of some of the electronic components that are generally present in a hard disk drive, e.g., drive 111 of FIG. 1, and in which is implemented an embodiment of the present invention. A controller 119 enables magnetic read/write heads 108/109 to process read/write signals. Controller 119 additionally outputs command signals, e.g., driving, braking, and the like, to spindle motor driver 554, and also receives signals such as spindle speed and spindle running current from spindle motor driver 554, via input/output line 556. Controller 119 further outputs command signals to actuator ((VCM (voice coil motor)) driver 555, via input/output line 557, so as to cause actuator 101 to move actuator arm 104 and therefore read/write head 108 to a predetermined position relative to hard disk 115 in accordance with the sector and track location of a signal that is to be written to or read from hard disk 115.

An acceleration detector 510 for detecting an external acceleration that may be applied to hard disk drive 111 is implemented, in an embodiment of the present invention. Acceleration detector 510 is communicatively coupled to MPU (microprocessor unit) 303 that is connected to spindle motor driver 554 and actuator motor driver 555. Acceleration detector 510 includes a transducer/friction converter 520 and a signal filter 530, both of which are described in detail in FIG. 6A and which are incorporated herein by reference. In an embodiment, acceleration detector 510 can be implemented wholly in software communicatively coupled to MPU 303 of controller 119 and/or spindle motor driver 554 and/or actuator motor driver 555. In an alternative embodiment, acceleration detector 510 can be implemented through a combination of software and hardware that can be combinationally disposed in and/or communicatively coupled to spindle motor driver 554, actuator (VCM) driver 555 and MPU 303 of controller 119.

Figure 6A:
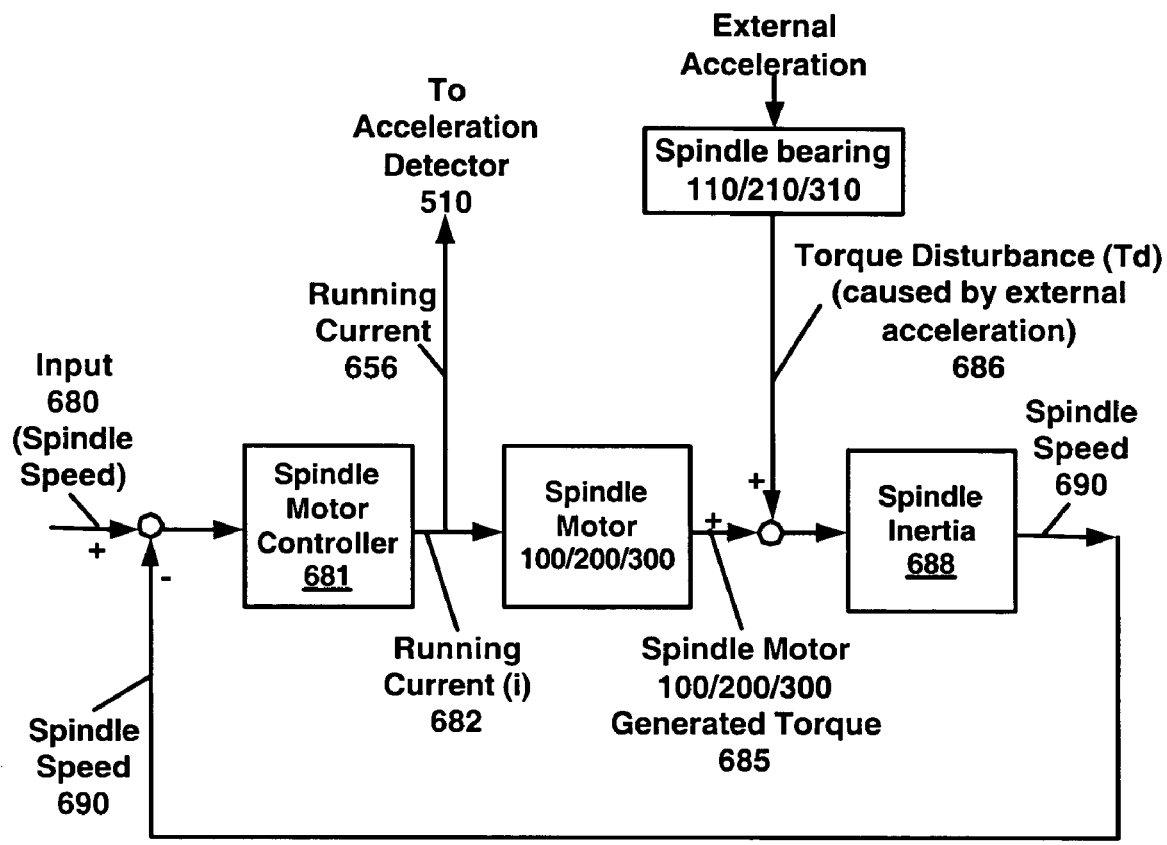
FIG. 6A is a circuit diagram of a closed loop control block utilized in conjunction with FIG. 5 for detecting an external acceleration, in an embodiment of the present invention.

FIG. 6A is a control diagram of a close loop block which incorporates torque disturbance (as described in FIG. 4) for maintaining proper spindle motor speed, running current, and torque, in an embodiment of the present invention. Closed loop block 675 includes a spindle motor controller 681 which can be a circuit, a microcontroller, a microprocessor program, a micro system, or a combination thereof, and which is programmed to behave in a certain manner. Spindle motor controller 681 is commonly utilized to maintain constant speed of a spindle motor, e.g., a spindle motor 210 and 310 of FIGS. 2 and 3, respectively. Close-loop control 675 further includes a spindle motor 100/200/300 and related generated torque 685, the result of the spindle motor converting running current into torque, and spindle inertia 688 representing the mass of spindle motor bearing system 210/310 and disk(s) 115 concurrent with spindle motor operation.

Spindle motor controller 681 receives an input that is a difference of spindle motor speed reference 680 (desired spindle motor speed) that is usually, but not always, a constant, and the actual spindle motor spin speed 690. Spindle motor controller 681 then outputs the associated spindle motor running current 682 to spindle motor 100/200/300. Spindle motor 100/200/300 converts the running current 682 into torque 685. It is noted that torque disturbance 686, as described above with reference to FIG. 4 and which is herein incorporated by reference, is combined with torque 685 generated by spindle motor 100/200/300. As described above with reference to FIG. 4, torque disturbance is caused by a change in friction by acceleration.

Continuing with reference to FIG. 6A, the combined value of motor torque 685 and torque disturbance 686, thus factoring in an external acceleration, are applied to spindle inertia 688. Spindle speed 690 changes in accordance with the torque applied thereto.

Figure 6B:
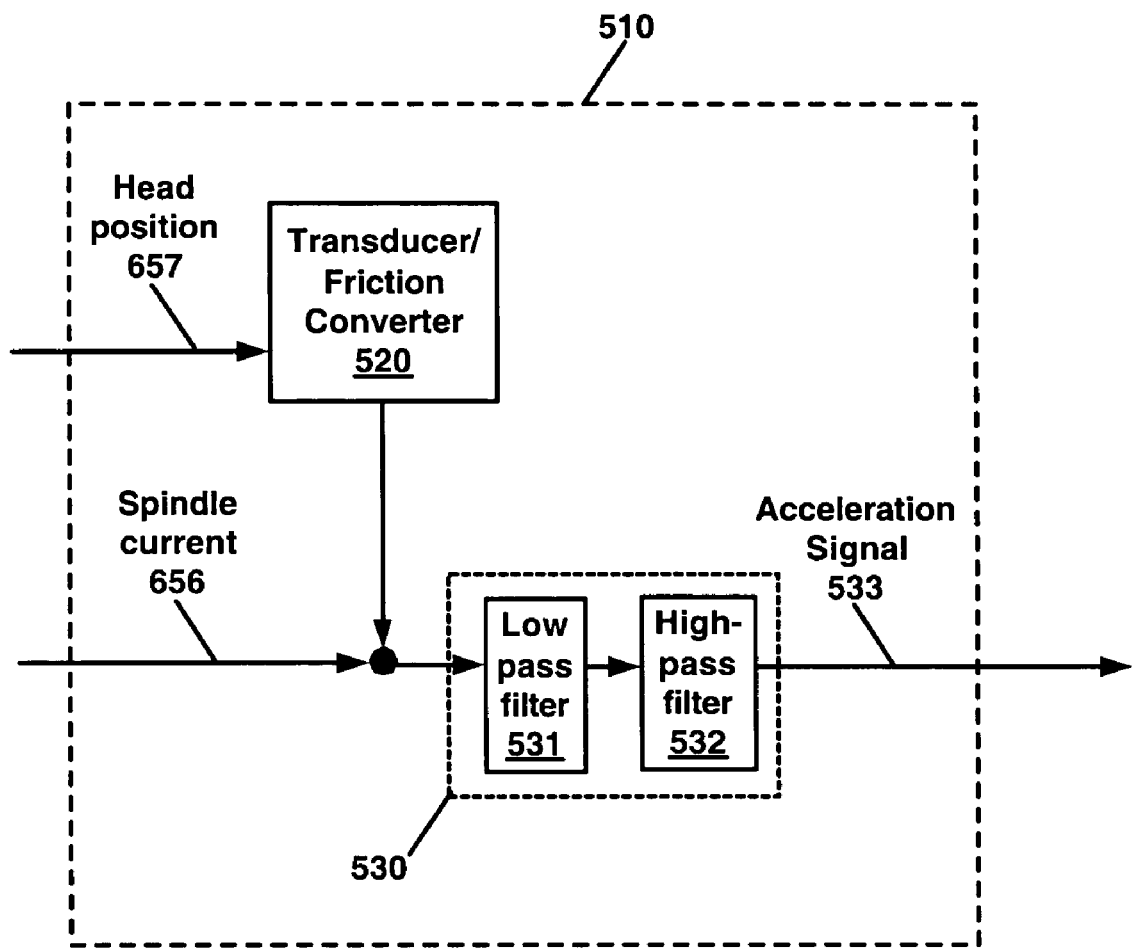
FIG. 6B is a block diagram of the components of the acceleration detector of FIG. 5 in an embodiment of the present invention.

FIG. 6B is a block diagram of acceleration detector 510 of FIG. 5, in an embodiment of the present invention. Acceleration detector 510 includes a transducer/friction converter 520. Converter 520 provides a conversion of the position of the head (108) relative to the friction required for the position. As described in FIG. 1, the spindle motor requires different running current depending upon the position of read/write head 108 relative to disk 115. The relationship is straightforward and one can easily measure or calculate this relationship and create a formula or a table that converts the position of a read/write head 108 to the required running current. This value is also taken into account for detecting an external acceleration. By accounting for the position of the read/write head 108 relative to the disk 115, that portion of the signal can be removed, providing a more accurate value from which to detect an accelerate event. In an embodiment, an equation can be implemented to perform the conversion. In another embodiment, a conversion table can be implemented to perform the conversion. Converter 520 receives the position of the head 108 via input/output line 657. Converter 520 outputs a resulting conversion value which is then combined with a spindle current value, via input/output line 656, in an embodiment of the present invention. The combined value is then outputted to signal filter 530 in an embodiment of the present invention.

The combined value contains the spindle motor running current that is a noisy signal by virtue of the signal switching because of commutation, the process of the magnet on the rotor assembly being subjected to a constantly switching signal, from positive to negative, to provide a constant direction of torque. That switching provides a high frequency noise that is present in the spindle motor control signal and, as such, mandates filtering. Accordingly, signal filter 530 then utilizes a low pass filter 531 for removing spindle motor switching noise. In an embodiment of the present invention, low pass filter 531 is configured as a 1 Hertz frequency filter. Alternatively, low pass filter 531 can be configured to filter higher frequencies or lower frequencies than a 1 Hertz frequency. In yet another embodiment, low pass filter 531 can filter a plurality of frequencies.

The combined value further contains DC offset which is the current needed to maintain constant spindle motor rotation when the spindle motor is running at the proper constant speed. It is therefore desirable to remove that baseline signal from the combined value. Accordingly, signal filter 530 then utilizes a high pass filter 532 for removing DC offset. In an embodiment of the present invention, high pass filter 532 is configured as a 1 Hertz frequency filter. Alternatively, high pass filter 532 can be configured to filter higher frequencies or lower frequencies than a 1 Hertz frequency. In yet another embodiment, high pass filter 532 can filter a plurality of frequencies. Subsequent to signal filtering by signal filter 530, the resulting acceleration signal is outputted via output line 533 to MPU 303 of controller 119. In an alternative embodiment of the present invention, signal filter 530 can utilize a high pass filter 532 for removing DC offset and then utilize a low pass filter 531 for removing spindle motor switching noise.

Figure 7:
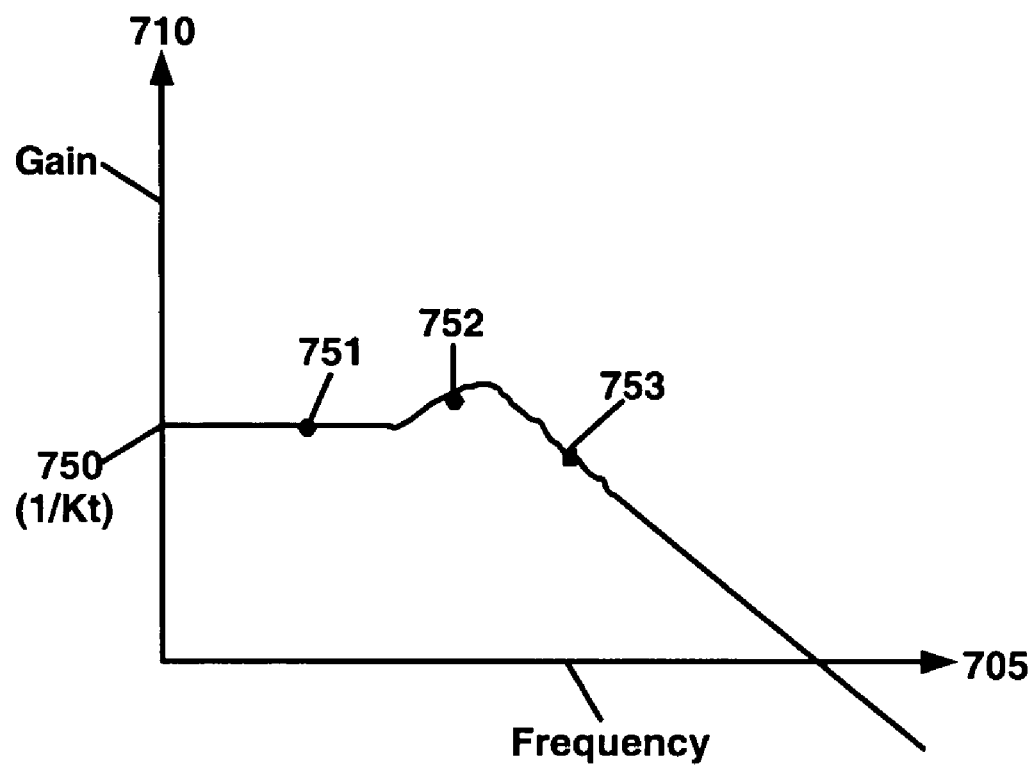
FIG. 7 is a graph diagram representing the transfer function of the closed loop system in FIG. 6A, where input is the torque disturbance and output is the spindle motor running torque.

FIG. 7 is a graph illustrating the behavior of a spindle motor controller system illustrated in FIG. 6A. This is a frequency-response graph which shows the gain (the ratio of input amplitude and output amplitude) as a function of frequency. Graph 700 displays the relationship from torque disturbance (e.g., torque disturbance of FIG. 4 and torque disturbance 686 of FIG. 6A) to the running current (e.g., running current 682 of FIG. 6A) in an embodiment of the present invention. Graph 700 includes an axis 705, the x axis, which represents frequency and an axis 710, the y axis, which represents gain. Graph 700 provides information regarding the relationship of running current 682 and torque disturbance 686. One well versed in the art of control theory will readily comprehend that typical closed-loop control system commonly, but not always, contains the type of frequency response shown in Graph 700.

Continuing, assuming a low frequency torque disturbance, the gain is somewhat flat at point 751 of line 750. However, as the frequency of the torque disturbance is increased, there is an initial increase in gain, shown as point 752, and then there is a subsequent decline in gain, shown as point 753. These characteristics are similar to those characteristics of a low pass filter. Advantageously, embodiments of the present invention are well suited to implement existing components and circuitry to provide detection of an external acceleration without substantial modification or reworking of a hard disk drive 111.

Figure 8:
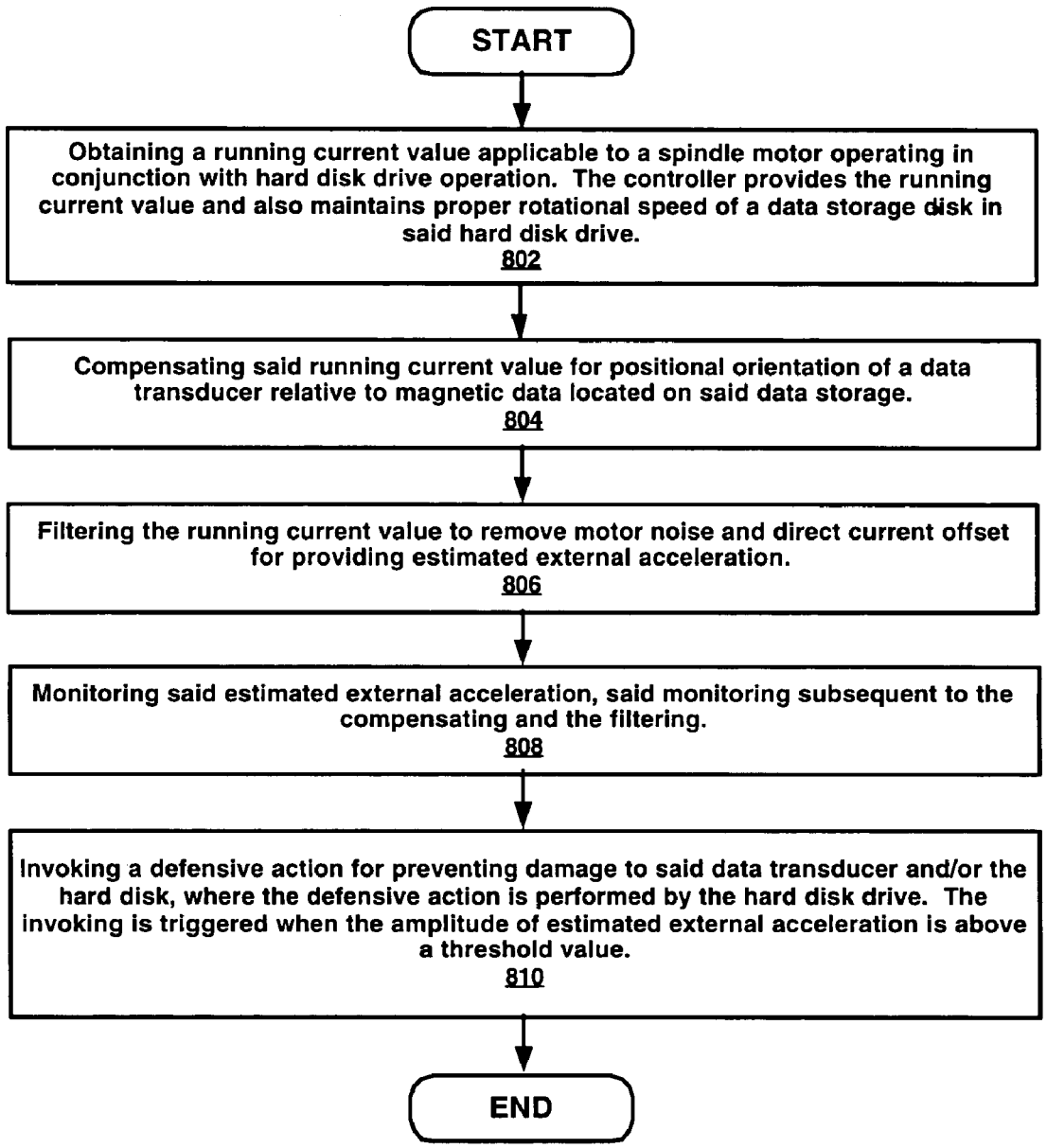
FIG. 8 is flow chart of a process for detecting an external acceleration applied to a hard disk drive in an embodiment of the present invention.
Figure 9:
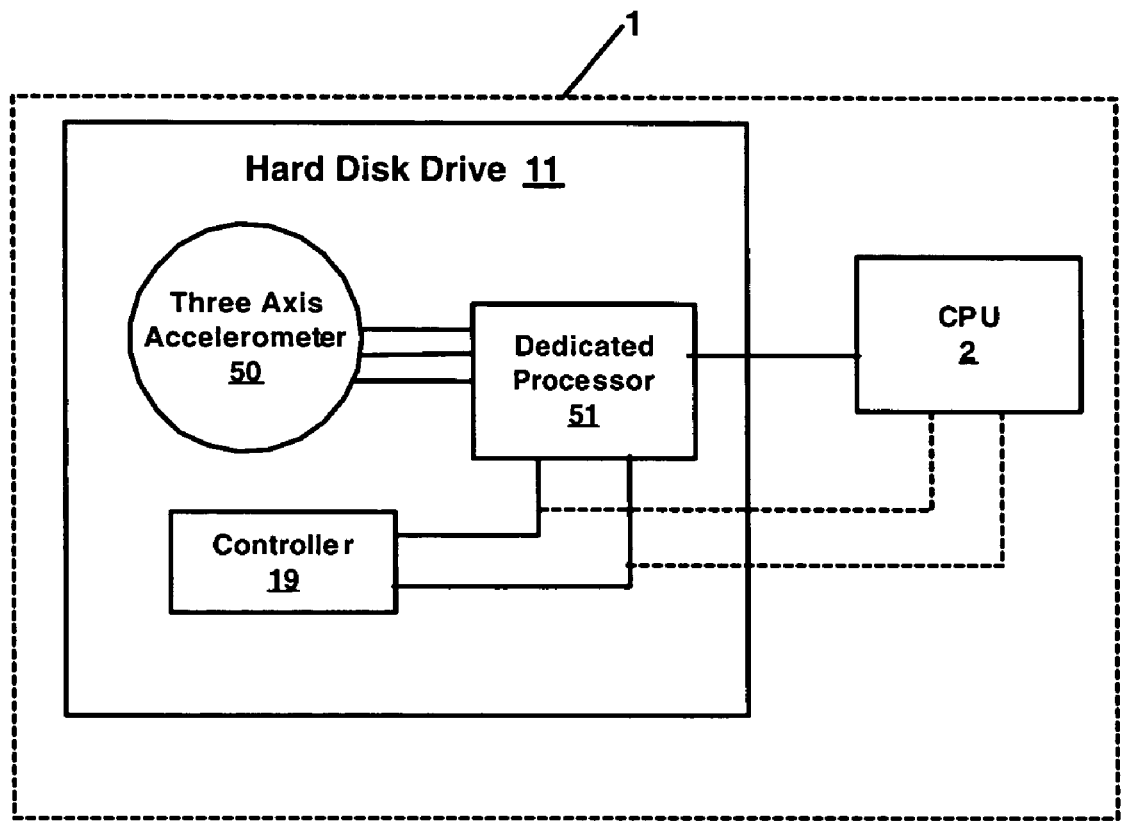
FIG. 9 is a block diagram of a prior art solution for detecting an external acceleration applied to a hard disk drive.

FIG. 8 is a flowchart 800 of steps performed in accordance with an embodiment of the present invention for detecting an external acceleration applied to a hard disk drive 111. Flowchart 800 includes processes of the present invention which, in some embodiments, are carried out by processors and electrical components under the control of computer readable and computer executable instructions. The computer readable and computer executable instructions reside, for example, in data storage features contained in controller 119 or other appropriate locations in a hard disk drive 111 of FIG. 1 or within the computer into which hard disk drive 111 is to be implemented. However, the computer readable and computer executable instructions may reside in any type of computer readable medium. Although specific steps are disclosed in flowchart 800, such steps are exemplary. That is, the present embodiment is well suited to performing various other steps or variations of the steps recited in FIG. 8. Within the present embodiment, it should be appreciated that the steps of flowchart 800 may be performed by software, by hardware or by any combination of software and hardware.

In operation 802 of flowchart 800, a running current value applicable to a spindle motor operating in a hard disk drive is obtained from a controller 119. Controller 119 provides the running current value and additionally performs the function of maintaining proper rotational speed of a data storage disk 115 in the hard disk drive 111.

In operation 804 of flowchart 800, the running current value is compensated for the positional orientation of the read/write head 108 relative to the magnetic data that is disposed on or is to be disposed on the data storage disk 115.

In operation 806 of flowchart 800, the running current is filtered to remove motor noise and direct current offset. This provides an estimated external acceleration value. In an embodiment of the present invention, a low pass filter, e.g., low pass filter 531, is used to remove motor noise and a high pass filter, e.g., high pass filter 532, is used to filter direct current offset.

In operation 808 of flowchart 800, the estimated external acceleration value is monitored. The monitoring compares the estimated external acceleration amplitude with a threshold value. In an embodiment of the present invention, the threshold value can be a level indicating an increase in estimated external acceleration amplitude. Alternatively, the threshold value can be a level indicating a decrease in estimated external acceleration amplitude.

In operation 810 of flowchart 800, a defensive action is invoked that prevents damage to the read/write head 108 and/or data storage disk 115 and/or the data. The defensive action, such as performing an unload, is triggered when the amplitude of the estimated external acceleration amplitude is above a pre-determined threshold value, in an embodiment of the present invention. In an alternative embodiment, the threshold value can be adjusted adaptively, dependent upon background acceleration.

Advantageously, embodiments of the present invention utilize components and features present within a hard disk drive to obtain information that can indicate an external acceleration has been applied to a hard disk drive. Further advantageous, by implementing existing infrastructures within the hard disk drive, embodiments of the present invention can be readily implemented in nearly all hard disk drives without requiring substantial modification of the hard disk drive and without substantial cost.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for detecting an external acceleration applied to a hard disk drive, said method comprising:
   obtaining a running current value applicable to a spindle motor operating in conjunction with hard disk drive operation, said running current value obtained from a controller coupled with said hard disk drive, said controller for maintaining proper rotational speed of a data storage disk in said hard disk drive;
   compensating said running current value for positional orientation of a data transducer relative to magnetic data located on said data storage disk and for torque disturbance wherein a bearing system associated with said hard disk drive is used as a part of determining said torque disturbance, said data transducer coupled with said hard disk drive;
   filtering said running current value to remove motor noise and direct current offset, wherein said running current having been subject to said compensating and said filtering provides an estimated external acceleration amplitude;
   monitoring said estimated external acceleration amplitude; and invoking a defensive action for preventing damage to said data transducer and said data storage disk and loss of data disposed on said data storage disk, said defensive action performed by said hard disk drive, said invoking triggered when said estimated external acceleration amplitude exceeds a threshold value.

2. The method as recited in claim 1 wherein said monitoring further comprises:
   comparing said estimated external acceleration amplitude with said threshold value.

3. The method as recited in claim 2 wherein said threshold value is a pre-determined value.

4. The method as recited in claim 2 wherein said threshold value is continuously adjusted in accordance to a background acceleration level.

5. The method as recited in claim 1 wherein said invoking a defensive action further comprises:
   causing said hard disk drive to perform an unload, said unload increasing a fly height of said data transducer relative to said data storage disk.

6. The method as recited in claim 1 wherein said filtering further comprises:
   implementing a plurality of filters in said hard disk drive for filtering said current, said filters communicatively coupled with said spindle motor and said hard disk drive, wherein one of said plurality of filters is a low pass filter for filtering said motor noise and wherein another of said plurality of filters is a high pass filter for filtering said direct current offset.

7. The method as recited in claim 1 wherein
   said bearing system is essentially selected from a group consisting of bearing systems comprising:
   a rotating shaft fluid dynamic bearing, a fixed shaft fluid dynamic bearing, a rotating shaft ball bearing and a fixed shaft ball bearing.

8. A hard disk drive enabled to detect an external acceleration applied to said hard disk drive, said hard disk drive comprising:
   a housing having an enclosed clean chamber;
   a data storage disk disposed within said housing;
   a data transducer disposed in said housing, said data transducer for reading data from and writing data to said data storage disk, said data transducer having coupled therewith a mechanism for inducing the movement thereof;
   a spindle motor for rotating said data storage disk, said spindle motor disposed in said housing, said spindle motor including a hub for retaining said data storage disk, a shaft coupled to said hub, a suitable bearing system for rotatably supporting said shaft and said hub, a rotor portion having a magnet coupled therewith, a stator for energizing said magnet in said rotor;
   a filter for filtering said hard disk drive, and wherein said hard disk drive performs a method of detecting an external acceleration applied to said hard disk drive, said method comprising:
   obtaining a running current value applicable to a spindle motor operating in conjunction with hard disk drive operation, said running current value obtained from a controller coupled with said hard disk drive, said controller for maintaining proper rotational speed of a data storage disk in said hard disk drive;
   compensating said running current value for positional orientation of a data transducer relative to magnetic data located on said data storage disk and for torque disturbance wherein a bearing system associated with said hard disk drive is used as a part of determining said torque disturbance, said data transducer coupled with said hard disk drive;
   filtering said running current value to remove motor noise and direct current offset, wherein said running current subsequent to said compensating and said filtering provides an estimated external acceleration amplitude;

monitoring said estimated external acceleration amplitude; and invoking a defensive action for preventing damage to said data transducer and said data storage disk and loss of data disposed on said data storage disk, said defensive action performed by said hard disk drive, said invoking triggered when said estimated external acceleration amplitude exceeds a threshold value.

9. The hard disk drive as recited in claim 8 wherein said invoking a defensive action further comprises:

causing said hard disk drive to perform an unload, said unload increasing a fly height of said data transducer relative to said data storage disk.

10. The hard disk drive as recited in claim 8 wherein said monitoring further comprises:

comparing said estimated external acceleration amplitude with said threshold value.

11. The hard disk drive as recited in claim 8 further comprising:

predetermining said threshold value.

12. The hard disk drive as recited in claim 8 further comprising:

adjusting said threshold value in accordance with a background acceleration value, said adjusting performed continuously during said hard disk drive operation.

13. The hard disk drive as recited in claim 8 wherein said filtering further comprises:

implementing a plurality of filters in said hard disk drive for filtering said current, said filters communicatively coupled with said spindle motor and said hard disk drive, wherein one of said plurality of filters is a low pass filter for filtering said motor noise and wherein another of said plurality of filters is a high pass filter for filtering said direct current offset.

14. The hard disk drive as recited in claim 8 further comprising:

configuring said spindle motor with said bearing system, said bearing system is essentially selected from a group consisting of bearing systems comprising:

a rotating shaft fluid dynamic bearing, a fixed shaft fluid dynamic bearing, a rotating shaft ball bearing and a fixed shaft ball bearing.

15. A system for detecting an external acceleration applied to a hard disk drive, said system comprising:

means for obtaining a running current value, said means for obtaining said running current value communicatively coupled to a controller operational in and coupled to said hard disk drive, said running current value applicable to a spindle motor operating in conjunction with said hard disk drive, said controller for controlling current to said spindle motor to provide proper rotational speed of a data storage disk in said hard disk drive;

means for compensating said running current value for positional orientation of a data transducer relative to magnetic data located on said data storage disk and for torque disturbance wherein a bearing system associated with said hard disk drive is used as a part of determining said torque disturbance, said means for compensating communicatively coupled to a data transducer driving means, said data transducer coupled to said hard disk drive;

means for filtering said running current value to remove motor noise and direct current offset, said means for filtering communicatively coupled with said data transducer driving means and said running current, said means for filtering providing an estimated external acceleration amplitude subsequent to said compensating and said filtering;

means for monitoring said estimated external acceleration amplitude; and means for initiating a defensive measure to provide damage protection, said means for initiating triggered when said estimated external acceleration amplitude exceeds a threshold value.

16. The system as recited in claim 15 wherein said means for monitoring further comprises:

means for comparing said estimated external acceleration amplitude with said threshold value, said threshold value a pre-determined threshold value.

17. The system as recited in claim 15 wherein said means for monitoring further comprises:

means for comparing said estimated external acceleration amplitude with said threshold value, said threshold value continuously adjusted in accordance with a background amplitude level.

18. The system as recited in claim 15 further comprising:

means for rotating said data storage disc, said means for rotating said data storage disc a spindle motor operable in said hard disk drive, said spindle motor having therewith said bearing system, said bearing system is selected from a group consisting of bearing systems essentially consisting of:

a rotating shaft fluid dynamic bearing, a fixed shaft fluid dynamic bearing, a rotating shaft ball bearing and a fixed shaft ball bearing.

19. The system as recited in claim 15 wherein said means for filtering further comprises:

a plurality of filtering means, wherein one filtering means is a low pass filter for filtering said motor noise and wherein another filtering means is a high pass filter for filtering said direct current offset.

20. The system as recited in claim 15 wherein said means for initiating defensive measures further comprises:

means to activate to unload, said unload causing an increase in fly height of said data transducer relative to said data storage disk.

* * * * *